United States Patent
Olesinski et al.

(10) Patent No.: US 7,054,274 B2
(45) Date of Patent: May 30, 2006

(54) METHOD AND APPARATUS FOR PROCESSING REQUESTS FOR STATISTICS IN A COMMUNICATION NETWORK

(75) Inventors: Wlodek Olesinski, Nepean (CA); Rashid Qureshi, Ottawa (CA); Mark Woodward, Carp (CA)

(73) Assignee: Alcatel Canada Inc., Kanata (CA)

( * ) Notice: Subject to any disclaimer, the term of this patent is extended or adjusted under 35 U.S.C. 154(b) by 936 days.

(21) Appl. No.: 09/833,531

(22) Filed: Apr. 11, 2001

(65) Prior Publication Data

US 2002/0150052 A1 Oct. 17, 2002

(51) Int. Cl.
*H04J 3/14* (2006.01)
*H04L 12/26* (2006.01)

(52) U.S. Cl. .................. 370/252; 370/235; 714/47; 709/226

(58) Field of Classification Search ............. 370/252, 370/235; 714/47; 709/226

See application file for complete search history.

(56) References Cited

U.S. PATENT DOCUMENTS

| | | | |
|---|---|---|---|
| 3,702,008 A | 10/1972 | Groth | |
| 5,615,323 A | 3/1997 | Engel et al. | |
| 5,623,540 A | 4/1997 | Morrison et al. | |
| 5,822,535 A * | 10/1998 | Takase et al. | 709/226 |
| 6,049,549 A | 4/2000 | Ganz et al. | |
| 6,366,563 B1* | 4/2002 | Weldon et al. | 370/252 |
| 6,661,778 B1* | 12/2003 | Trofin et al. | 370/252 |
| 2002/0143929 A1* | 10/2002 | Maltz et al. | 709/226 |
| 2003/0115508 A1* | 6/2003 | Ali et al. | 714/43 |
| 2005/0013300 A1* | 1/2005 | Akahane et al. | 370/395.3 |

* cited by examiner

Primary Examiner—Ricky Ngo
Assistant Examiner—Feben Micael Haile
(74) Attorney, Agent, or Firm—McCarthy Tétrault LLP

(57) ABSTRACT

A method and apparatus of initiating a plurality of requests for statistics to be sent to an associated plurality of nodes in a segment of a communication network is provided. One or more requests are associated with an individual node. Each node has one or more node attributes. The method includes defining a sequence for initiating the requests to be sent to the nodes. The sequence is based on a value of a selected node attribute of each node. The method also includes initiating the requests according to the sequence.

28 Claims, 8 Drawing Sheets

300

| | Node | Node Attribute 312 | Node Attribute 313 | Node Attribute 314 | Node Attribute 315 | Node Attribute 316 |
|---|---|---|---|---|---|---|
| 361 | 161 | 7 | 4.0 | A | 2 | 1 |
| 362 | 162 | 3 | 2.3 | B | 3 | 6 |
| 363 | 163 | 4 | 6.8 | A | 4 | 9 |
| 364 | 164 | 2 | 4.2 | C | 1 | 7 |
| 365 | 165 | 1 | 2.6 | B | 2 | 2 |
| 366 | 166 | 6 | 0.2 | B | 4 | 4 |
| 367 | 167 | 4 | 6.6 | C | 2 | 2 |
| 368 | 168 | 3 | 5.4 | A | 3 | 1 |
| 369 | 169 | 9 | 10.2 | B | 2 | 4 |
| 370 | 170 | 2 | 5.6 | C | 3 | 4 |
| 371 | 171 | 6 | 6.3 | A | 2 | 2 |

Columns: 321, 322, 323, 324, 325, 326

500

| | Node | Node Attribute 510 | Node Attribute 512 | Node Attribute 514 |
|---|---|---|---|---|
| 501 | 401 | 401 | 1 | .9 |
| 502 | 402 | 402 | 1 | .8 |
| 503 | 403 | 403 | 1 | .7 |
| 504 | 404 | 404 | 1 | .68 |
| 505 | 405 | 405 | 1 | .65 |
| 506 | 406 | 406 | 1 | .6 |
| 507 | 407 | 407 | 2 | 2.9 |

| Node | Upper Bound |
|------|-------------|
| 601  | 1           |
| 602  | 1           |
| 603  | 3           |

METHOD AND APPARATUS FOR PROCESSING REQUESTS FOR STATISTICS IN A COMMUNICATION NETWORK

FIELD OF THE INVENTION

The invention relates generally to data communications, and more particularly to a method and apparatus for processing requests for statistics in a communication network.

BACKGROUND OF THE INVENTION

Communication networks comprise a plurality of nodes, or switches, which are interconnected to form a web of nodes. Users communicate with other users in the network by transmitting messages and data through the network. Data is routed or switched through a path of connected nodes from the node associated with the sender to node associated with the recipient.

Each node may maintain a set of statistics relating to the network traffic passing therethrough. Statistics include performance, usage or billing data collected from a communication network. The statistics may be used for billing purposes, evaluation of network performance at a node and fault diagnostics that may be present about a node. Typically, statistics are tracked using software modules which track aspects of the statistics in counters or registers internal to the nodes. The counters may be embodied in hardware or software using techniques known in the art. Generally, to conserve resources, the counters maintain only recent data. Further, the counters may be configured to be reset after a predetermined time period or interval. Typical reset intervals are 5 minutes, 15 minutes, 60 minutes and 24 hours. The counter occupies a portion of memory on the node to store data from the previous interval while compiling data for the current interval. At the end of the current interval, interval data is written over the memory contents for the previous interval. The counter for the current interval is reset and then begins to track data for the current interval. As such, statistics must be collected in every interval in order to retain timely statistics.

In prior art systems, there are statistics collection systems for a communication network which typically send statistics requests to the network using the known simple network management protocol (SNMP) or other protocols appropriate for the nodes. The statistics collection system typically communicates with the network using a separate device, a statistics collection unit. The statistics collection unit is typically external to the network and is connected to the network using a dedicated network management functionality communication link.

It will be appreciated that statistics collection requires resources. Processing a request for statistics collection from the statistics collection unit by a node requires that the node utilize its processing resources, thereby diverting resources from processing switching or routing traffic. Accordingly, nodes typically are not optimized for statistics collection processing and generally commit only limited resources thereto. The statistics collection unit is also resource limited because of the vast number of nodes in the network to be queried.

There are two limitations that may limit the capacity in the network for statistics collection: system level limitations and per-node limitations. System level limitations include: (i) time required for building requests and managing responses, (ii) upper bound on the number of items that can be transmitted with a single request and (iii) upper bound on outstanding requests in a segment of the network given capacity of the links in the segment and the number of expected responses. Per-node limitations include: (i) node response time, (ii) node resource limitations and (iii) upper bound on the number of outstanding requests for the node given that the node must divert switching resources to respond to such requests. An outstanding request is a request for which a response from the node has not yet been communicated to the statistics collection unit.

In prior art systems, requests for statistics for a specific interval are sent to the network in blocks which are not modelled for bandwidth or other efficiencies. As such, the system and per-node constraints may combine to defer requests to a node so that statistics collection is not maximized for a given interval. This may result in a loss of statistical data. Timely polling of the counters in a node must occur Or the overall statistics collection process will produce incomplete or inaccurate results.

Additionally, in the prior art, a statistics collection unit may use an overly conservative constraint for the number of outstanding requests allowed for a particular node. A typical conservative constraint used is the smallest number of outstanding requests allowed for the nodes in the segment or network as the constraint for every node in the segment or network. This may underutilize a given node and defer further requests for that node until the current outstanding requests are answered. Deferring requests to the node may result statistics collection not being maximized for a given interval resulting in a loss of statistical data.

There remains a need for a system and method which improves upon the use of available resources in processing requests for statistics to nodes in a network.

SUMMARY OF THE INVENTION

In a first aspect of the inventions a method of defining an order for sending a plurality of requests for statistics to an associated plurality of nodes of a communication network is provided One or more requests are associated with an individual node. Each node has one or more node attributes. The method includes defining a sequence for sending the requests to be sent to the nodes. The sequence is based on a value of a selected node attribute of each node. The method also includes initiating each of the requests according to the sequence.

The method may define for each node a translated value related to the value of the selected node attribute prior to defining the sequence and base the sequence on a ranking of all of the translated values.

The method may select two or more node attributes and for each of these node attributes, refine the ranking of the nodes based on the value of each of those node attributes.

The method may receive data regarding a plurality of responses from the nodes which received requests. The method may track a number of outstanding requests in a segment of the communication network. The segment includes the associated nodes. The number of outstanding requests relates to a number of requests in the segment for which responses have not been received. The number of outstanding requests is associated with an upper bound number. The method may also initiate each of the requests by comparing the number of outstanding requests in the segment with the upper bound number and initiate one request when the number of outstanding requests in the segment is less than the upper bound number.

The method may receive data regarding a plurality of responses from each node which received the requests. The method may track a number of outstanding requests for each node. The number of outstanding requests for each node relates to a number of requests for which responses have not been received for each node. Each number of outstanding requests is associated with an upper bound number. The method may, for each node, initiate the requests when the number of said outstanding requests is less than the upper bound number, each request being sent independently to its associated node.

The method may separately define the upper bound number for each node in the segment.

The method may select a selected node attribute which has a value representing a number of requests to be initiated for each node in a time interval. The method may define the sequence by ranking the nodes in descending order utilizing each of the values of the selected node attribute of the nodes.

The method may select a selected node attribute which is a response time of each of the nodes to previous requests. The method may define the sequence by ranking the nodes in descending order utilizing each of the values of the selected node attribute of the of nodes.

The method may select a selected node attribute which identifies an operating characteristic of each of the nodes. The method may define the sequence by ranking the nodes in a predetermined order utilizing each of the values of the selected node attribute of the nodes.

The method may utilize an operating characteristic which indicates wireless and nonwireless transmission technologies associated with each of the nodes. The method may define the sequence by ranking the nodes utilizing values of the operating characteristic and ranking nodes having wireless transmission technologies with a higher priority.

The method may be embodied in a computer program.

The method may be repeated in a cyclic time interval.

The method may track a second number of other outstanding requests for each of the nodes. The second number of other outstanding requests for each of the associated nodes relates to a number of requests for each of the nodes for which responses have not been received. Each second number of other outstanding requests is associated with a nodal upper bound number. The method may initiate each request when the number of outstanding requests for the segment is less than the upper bound number and the second number of other outstanding requests is less than the nodal upper bound number for the individual node associated with each request.

In a second aspect of the invention, a statistics collection unit associated with a communication network is provided. The communication network includes a plurality of nodes and each of the nodes has one or more node attributes. The statistics collection unit includes a computer and a program executed on the computer. The program includes a sequencing module defining a sequence for sending requests for statistics to be sent to an associated plurality of nodes. One or more requests are associated with an individual node. The sequence is based on a value of a selected node attribute of each node. The program also includes an initiating module initiating each of the requests according to the sequence.

In a third aspect of the invention, an apparatus for use in a statistics collection unit in a communication network is provided. The communication network includes a plurality of nodes. The apparatus includes a device defining a sequence for sending the requests for statistics to be sent from the statistics collection unit to an associated plurality of nodes in the segment.

In a fourth aspect of the invention, a computer executable program for use on a communication network is provided. The communication network includes a plurality of nodes. The computer executable program executes the step of defining a sequence for sending a plurality of requests for statistics to be sent to an associated plurality of nodes. One or more requests are associated with an individual node. Each node has one or more node attributes. The sequence is based on a value of a selected node attribute of each of the nodes. The computer executable program also executes the steps of initiating each of the requests according to the sequence.

In other aspects, the invention provides various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes):

FIG. 5A is a table exemplary of node attributes for nodes for the communication network of FIG. 4;

FIG. 6A is a table examplary of upper bounds for outstanding requests for nodes in another communication network.

DETAILED DESCRIPTION OF AN EMBODIMENT

Figure 1:
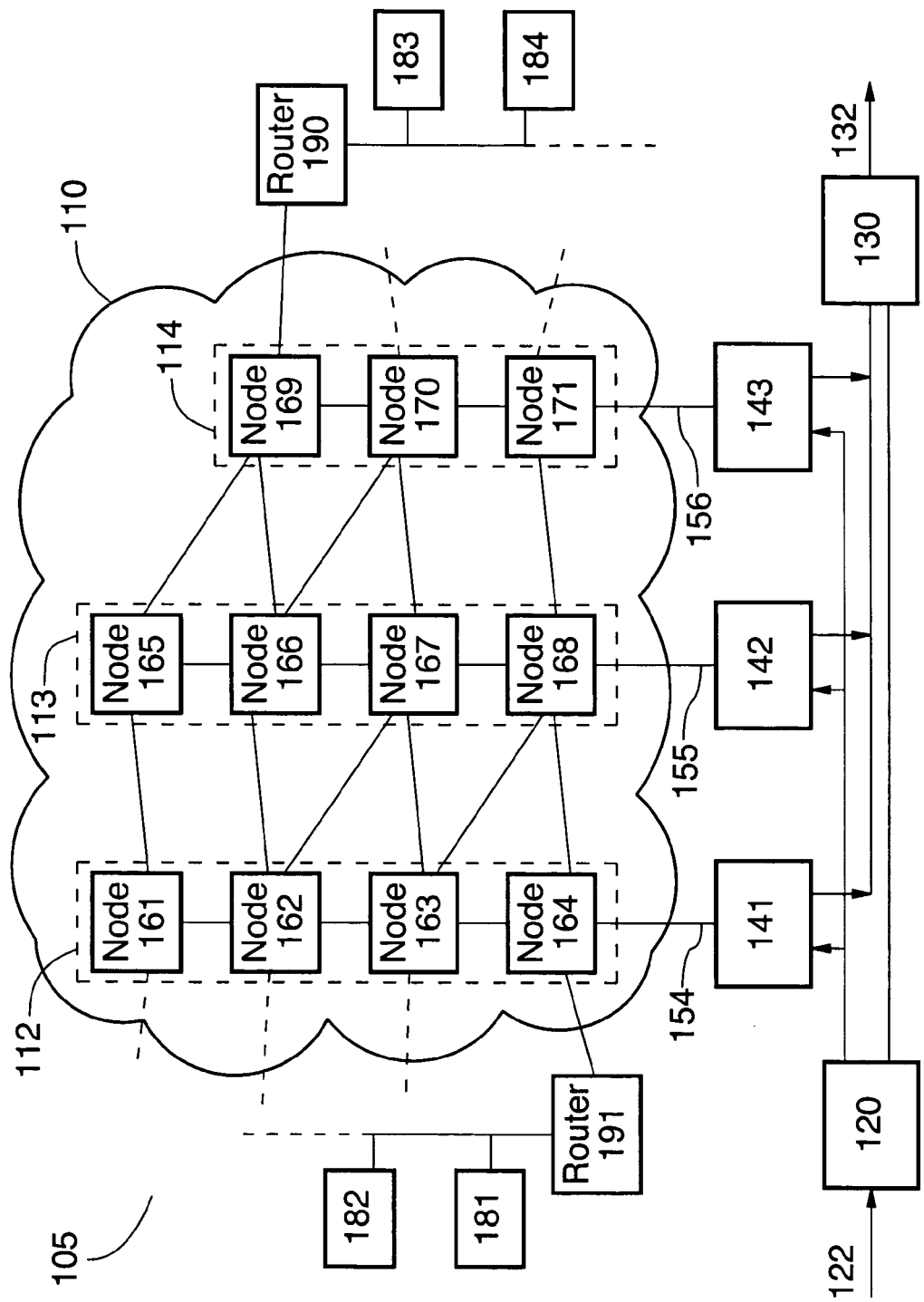
FIG. 1 is a block diagram of a communication network including a statistics collection unit in accordance with an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

The foregoing embodiment relates to a method and apparatus for processing requests for statistics to be sent to the nodes in the network in a defined sequence. The manner of defining the sequence in this embodiment is configurable. Therefore, the requests may be sent in an intelligent manner, utilizing information gathered from the network to define a sequence in which to initiate the requests, providing efficient use of the bandwidth resources of the connection to the network and of the nodes themselves. Alternatively, the sequence may be defined to minimize the number of selected resource tracking statistics which may be reset before their data is retrieved.

First, a description of a communications system associated with an embodiment is provided. Referring to FIG. 1, data communication network 105 provides the capability for compiling statistics that are recorded by various nodes included within data communication network 105. Data communication network 105 comprises network cloud 110 that includes a plurality of interconnected nodes, or switches, 161–171.

It will be appreciated that network cloud 110 may be any packet switched network. For example, network cloud 110 may utilize asynchronous transfer mode (ATM) protocol for communication. In an ATM network, nodes 161–171 may be ATM nodes or switches.

Nodes 161–171 in network cloud 110 are grouped into segments, or subnets, 112–114. First segment 112 includes nodes 161–164; second segment 113 includes nodes 165–168; and third segment 114 includes nodes 169–171.

End users 181–184 may be connected to network cloud 110 via routers 190 and 191, allowing data to be transmitted amongst end users 181–184 through nodes 161–171 in network cloud 110. For example, a packet may be sent from end user 184 to end user 181, from user 184, to router 190, to network cloud 110, to router 191 and finally to end user 181.

As is illustrated, each of node segments 112–114 operably communicates with its associated statistics collection unit 141–143. Statistics collection units 141–143 may communicate to node segments 112–114 via dedicated network management functionality communication links 154–156. Each statistics collection unit 141–143 is responsible for gathering the appropriate statistics within its associated node segment 112–114. Statistics collection units 141–143 typically use a general purpose computer with specialized network management software operating thereon which gathers statistics from their segments 112–114.

The following description of an embodiment will refer to statistics collection unit 143, link 156, segment 114, and nodes 169–171 to illustrate aspects of the embodiment within a segment of network cloud 110. It will be appreciated that the same general description will apply to statistics collection unit 141, link 154, segment 112, and nodes 161–164 and statistics collection unit 142, link 155, segment 113, and nodes 165–168.

As described earlier, traffic transmitted through network cloud 110 may be monitored using counters. As such, each of nodes 161–171 comprise a number of counters for storing a set of statistics relating to traffic flow through the nodes and possibly other characteristics of the node. Again, the counters may be embodied in hardware, software or other means known in the art. Typically, the counters are reset after a predetermined time interval regardless as to whether or not their data has been collected. If the data from the counters is not collected in each interval, some data will be lost and the overall statistics collection process will produce incomplete or inaccurate results.

Figure 2:
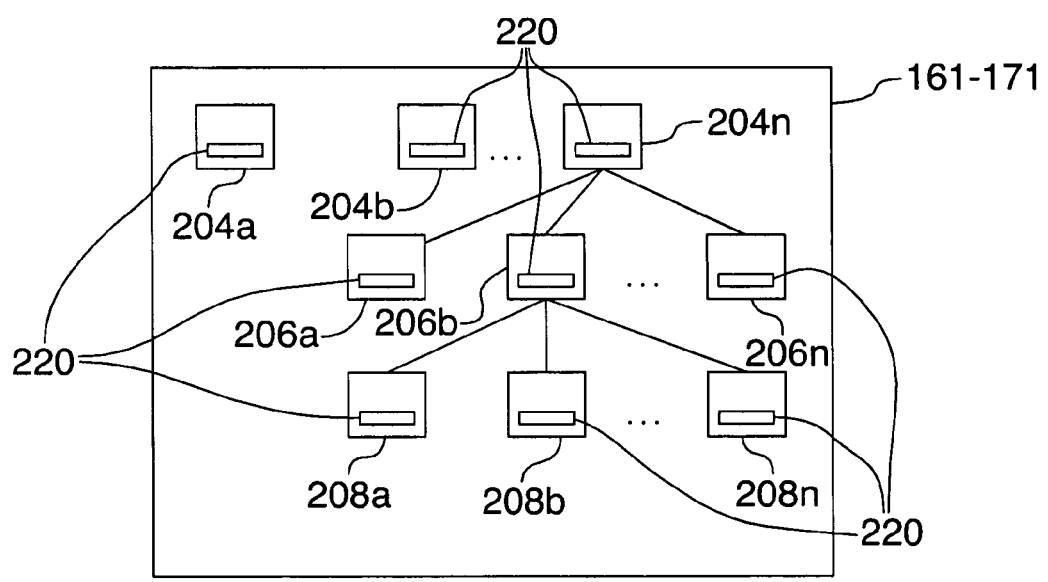
FIG. 2 is a block diagram of a node and its subcomponents in the communication network of FIG. 1.

Referring to FIG. 2, each node 161–171 may include a number of subcomponents. The hierarchical structure of each node 161–171 may include a number of cards 204a, 204b, . . . 204n, where the cards may process communications utilizing a number of devices 206a, 206b, . . . 206n, and where the devices may each support a number of connections, 208a, 208b, . . . 208n. A card is a physical entity having a number of devices. A device (or port) is a physical or logical entity that groups connections. Connections carry user data and are made between devices. There may be many connections per device. Each of these hierarchical components may include specific counters 220 for collecting statistics for that particular hierarchical component. As such, statistics requests from statistics collection unit 143 may be targeted at a particular counter 220 within a particular hierarchical component within each associated node 161–171 of each request.

Referring to FIG. 1, statistics management block 120 receives network statistics configurations 122 that are generated by an automatic billing routine or some other entity that may request a particular statistic or set of statistics. Any network statistics configurations 122 received by statistics management block 120 must be processed and parsed to generate statistics collection configuration information which is provided to statistics collection units 141–143. The parsing performed by statistics management block 120 is based on the distribution of nodes 161–171 that contain the requested statistics amongst the various node segments 112–114.

The statistics collection configuration information contains information concerning the nodes and their subcomponents required to respond to network statistics configuration 122 which is used to determine the protocol, frequency of polling and other parameters needed for the requests. Statistics management block 120 sends each set of statistics collection configuration information to its associated statistics collection unit 141–143.

When statistics collection unit 143 receives statistics collection configuration information from statistic management block 120, statistics collection unit 143 will form and send statistics requests to nodes 169–171 in node segment 114. Each individual request from statistics collection unit 143 is associated with, i.e. addressed to, a node 169–171 in segment 114 from which it requests statistics. It will be appreciated that statistics requests sent to the various nodes in network cloud 110 may be sent using SNMP or other polling protocols. It will be appreciated that statistics collection unit 143 may use software and/or hardware to process the initiation and processing of requests to nodes 169–171 in its segment 114. As described previously, statistics collection unit 143 in the embodiment uses a general purpose computer with specialized network management software operating thereon. However, other embodiments may have hardware embodied in customized circuitry, an ASIC, a microcontroller, and other electronics. The software may be embodied in one or more computer programs executing on one or many pieces of the hardware.

Statistics are sent from nodes 169–171 to statistics collection unit 143 in response to scheduled polling and event driven collection. In scheduled polling, the statistics collection unit 143 periodically sends requests to nodes 169–171 to respond with the required data. The requests may be sent at regular or irregular intervals. In event driven collection, requests are not sent by statistics collection unit 143.

An example of the type of statistics that may be tracked is the number of data packets being sent through network cloud 110 from end user 181 to either of end users 183 and 184. Statistics management block 120 receives network statistic configuration 122 relating to this requirement and generates statistics collection configuration information. The statistics collection configuration information is passed to each statistics collection unit 141–143. In this example, the individual requests are sent to a number of nodes 161–171 in a number of segments 112–114 in network cloud 110. Each statistics collection unit 141–143 collects the statistics corresponding to traffic sent by end user 181 from its associated nodes 161–171 via sending individual requests to one or more of nodes 161–171. It will be appreciated that the sequence in which the individual requests are sent by statistics collection unit 143 may affect how much data is gathered from each of nodes 169–171 in each interval since both system and per-node limitations can defer the arrival of individual requests for statistics or the responses thereto.

As described earlier, there are limitations in processing requests. System level limitations include the time required for building a request, the number of items that can be transmitted with a single request and the upper bound on outstanding requests in segment 114 given the capacity of links in segment 114 and the number of expected responses from nodes 169–171. Per-node limitations include the response time for each of nodes 169–171, computational processing limitations for nodes 169–171 and the upper bound on the number of outstanding requests for each of nodes 169–171 that marks when each node must divert switching resources to respond to such requests. An outstanding request is a request for which a response from its associated node 161–171 has not yet been communicated to its statistics collection unit 141–143.

The embodiment utilizes algorithms to initiate requests in a sequence to make efficient use of available resources, including bandwidths, of the node and the network. Alternatively, the sequence can be defined so that the number of requests to specific counters (chosen by the network operator) is maximized. It will be appreciated that, in some circumstances, resource usage may be managed by defining the sequence for initiating requests using a time-response algorithm that allows response to a greater number of requests from all nodes. In other circumstances, resource usage may be managed by defining the sequence on a hierarchical node ordering system, collecting data from specific nodes first.

Figure 3:
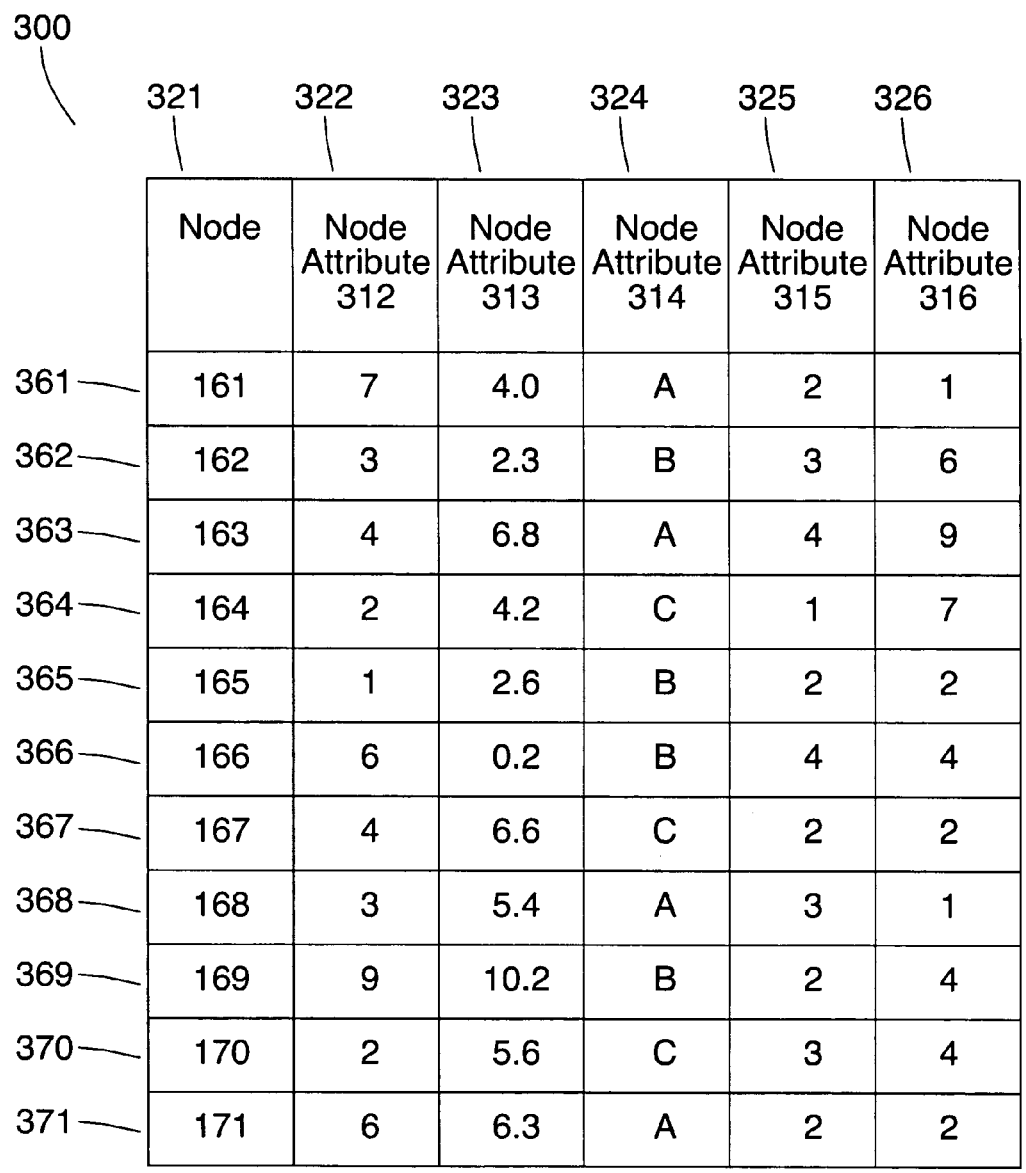
FIG. 3 is a block diagram illustrating sets of node attributes for nodes for the communication network of FIG. 1.

Referring to FIG. 3, information that may be used to define the sequence for initiating the requests to nodes 169–171 is stored in sets of node attributes 369–371. Similarly, the information that may be used to define the sequence for initiating the requests to nodes 161–164 and nodes 165–168 is stored in sets of node attributes 361–364 and sets of node attributes 365–368, respectively. Each set of node attributes 361–371 comprises data gathered from nodes 161–171 during previous requests for statistics, information obtained from network 110 and information derived from that data. An example of information which may be contained in sets of node attributes 361–371 for nodes 161–171 is presented in table 300, where each row of table 300 represents a set of node attributes 361–371 for nodes 161–171. Statistics collection unit 143 is able to access the information contained in sets of node attributes 369–371 for nodes 169–171 in segment 114. To do so efficiently, sets of node attributes 369–371 are stored in an area that is readily accessible to statistics collection unit 143. In the present embodiment, node attributes for their respective segments 112–114 are stored in the memory associated with each statistics collection unit 141–143. It will be appreciated that sets of node attributes 369–371 may be stored in random access memory, data registers, a hard disk, a floppy disk and any other read/write storage media accessible by statistics collection unit 143.

The network operator selects a particular node attribute 312–316 to be the selected node attribute for segment 114 or network cloud 110. The network operator may base this selection on the past performance of nodes 169–171. Choices for the selected node attribute may include: (i) the number of requests sent to nodes 169–171 in an interval (node attribute 312), (ii) the average response time for receiving a response from nodes 169–171 (node attribute 313), (iii) the class of node associated with the request (node attribute 314), (iv) the number of timeouts per node (node attribute 315) and (v) the number of counters on nodes 169–171 from which to collect data (node attribute 316). It will be appreciated that node attributes are not limited to those identified above and may be any information accessible about the node, its past performance in the network, information available from the network, previously gathered statistics and other attributes that may be derived from this information.

Once a selected node attribute has been selected, statistics collection unit 143 defines a sequence in which to initiate statistics requests to nodes 169–171 within segment 114. Representations of nodes 169–171 in segment 114 are ordered by the value of their selected node attributes according to the predetermined ranking algorithm. In this way, the sequence is based on the value of the selected node attributes of nodes 169–171. The requests are then initiated in the sequence based on the ranking of the representation of their associated nodes 169–171. It will be appreciated that initiating the requests is subject to system and per-node constraints that may affect the sequence in which they are sent.

The algorithm used to define the sequence is executed on the hardware that comprises statistics collection unit 143. This hardware is part of the device which defines the sequence and initiates the requests within statistics collection unit 143. The device may be a central processing unit, a piece of hardware specially hardwired for this task, a microcontroller, or a general purpose computer, among other things Alternatively, it will be appreciated that a device separated from statistics collection unit 143 may be provided with hardware and software to access sets of node attributes 369–371 and define a sequence for initiating the requests in segment 114. The device then communicates the sequence to its associated statistics collection unit 143 to initiate the requests based on that sequence, subject to system and per-node constraints that may affect the sequence of the requests.

Defining the sequence of requests is illustrated by the following example. First, the network operator selects node attribute 312 as the selected node attribute for segment 114 and wishes to define the sequence for initiating requests in ascending order of this value. Statistics collection unit 143 accesses sets of node attributes 369–371 for the value of node attribute 312 for nodes 169–171. The values for node attribute 312 are 9, 2 and 6 for nodes 169, 170 and 171 respectively. In this example, the algorithm defines the sequence as initiating requests to node 170, node 171 and node 169, in that order, subject to system and per-node constraints. Therefore, statistics collection unit 143 will initiate requests in this sequence subject to these constraints The network operator may select two or more node attributes 312–316 to be selected node attributes. When two or more node attributes 312–316 are selected as selected node attributes, the network operator also specifies the order in which the selected node attributes will be used to define the sequence. Selecting more than one selected node attribute results in a ranking that is iteratively refined where the first selected node attribute is used to rank the representation of its associated node and then representations with the same value or range of values of the selected node attribute for the first ranking are ranked by the next selected node attribute. The representations with the same values or ranges of values for the selected node attributes for all of the previous rankings are then ranked by the next selected node attribute. This continues until the representations have been ranked by all of the selected node attributes.

For example, network operator chooses node attributes 314 and 315 as selected node attributes. The values of node attributes 314 and 315 are to be ranked in ascending numerical and alphabetical order and node attribute 315 is to be used to rank the representations of nodes 169–171 before node attribute 314. The algorithm ranks the representations for nodes 169 and 171 before node 170 when ranking by node attribute 315. The algorithm then refines the ranking for each group of representations with the same value for previous node attributes, nodes 169 and 171 and node 170 by node attribute 314. This results in a sequence for initiating requests for node 171, node 169 and node 170, in that order, Algorithms used to rank the representations of nodes 169–171 by the value of their selected node attributes may differ depending on the information in the selected node attribute and the method for defining the sequence for initiating the requests. For example, ranking by the value of node attribute 312 by statistics collection unit 143 may rank the representations in ascending or descending order, depending upon the desired result. If the selected node attribute contains a character string, as does node attribute 314, the algorithm may rank the by the value of the selected node attribute alphabetically. Alternatively, the algorithm may rank by the value of the selected node attributes in a predetermined order based on the possible values for the selected node attributes. For example, the algorithm may sequence class B attributes first, followed by class "C" and class "A", in that order. It will be appreciated that an operating characteristic of the nodes may be this class distinction. An example of such an operating characteristic may be the distinction between nodes which correspond to wireless transmission technologies and nodes that do not. A network operator may cause the algorithm to rank the wireless class of nodes before other types of nodes thus giving a higher priority to the wireless class of nodes.

The algorithm used to define the sequence for initiating the requests may translate the selected node attributes into values that are more readily sortable prior to ranking them. The translated value for nodes 169–171 is a function of the value of their selected node attributes. The algorithm then uses the translated value to define the sequence for initiating the requests. For example, a selected node attribute containing a real number may be converted to an integer. Another example is an algorithm that translates node attribute 314 having a value of class "A" to the integer 1, class "B" to 2 and class "C" to 3 and ranking them in ascending order. The translation portion of the algorithm may also define the values for selected node attributes within a certain range to have the same value for their translated values. Whether a translation occurs depends on the type of information found in the selected node attribute and how the algorithm is used to define the sequence based on those values.

In the embodiment described, the algorithm ranks the representations of the nodes only in ascending order and maps selected node attribute values to an integer value used for this ranking. The desired sequence for initiating the requests will affect how this translation occurs. For example, referring to FIG. 3, ranking the representations for nodes 169–171 in segment 114 by the quickest response time first, node attribute 323, may require a translation of the value of node attribute 323 to an integer. One method of achieving this result is to truncate the values to integers. That will produce "10", "5" and "6" for the translation of the values of node attribute 323 for nodes 169, 170 and 171, respectively. Ranking the translated selected node attributes in ascending order results in a sequence for initiating requests for node 170, node 171 and node 169, in that order. Ranking by the slowest response time first in segment 114 will also require a translation of the value of node attribute 323 to an integer but the translation must also reverse the order of the values of node attribute 323. One method of achieving this result is to truncate the values to integers and take the negative as the translated value. That will produce "–10", "–5" and "–6" for the translation of node attribute 323 for nodes 169, 170 and 171, respectively. Ranking the translated selected node attributes in ascending order results in a sequence of requests for node 169, node 171 and node 170, in that order.

In the embodiment, the requests themselves are not ranked but representations of the nodes with which they are associated are ranked The ranked representations are used to determine the order in which nodes should be polled. The sequence of requests is defined by sending requests for the nodes in the order of this ranking. The association of requests with the representations of their nodes may be maintained using an array of pointers. It will be appreciated that the requests themselves may be stored in a sequenced order to accomplish the same goal of initiating the requests in a defined sequence. Also, it will be appreciated that it may not be necessary for the representations of nodes to be stored in a sequenced order prior to sending the requests to those nodes. This may be accomplished through an array of pointers to the representations of the nodes where the array of pointers indicates the sequence of nodes to which requests will be sent.

Referring to FIG. 1, it will be appreciated that in other embodiments statistics collection unit 143 may send requests in an order other than that of the defined sequence due to system and per-node constraints. For example, a statistics collection system typically has other constraints preventing statistics collection unit 143 from sending too many requests without receiving responses for those requests.

One such constraint is the limit on the capacity of the links in segment 114, for example, the capacity of link 156 for statistics collection unit 143. Each link in segment 114 is able to receive only a predefined number of messages at a time, therefore, there is an upper bound on the number of outstanding requests in segment 114 to prevent the links from being overloaded with messages It will be appreciated that the value of this upper bound may be different in each segment 112–114 and may be some number other than the actual upper bound.

To track statistics related to the upper bound in the segment, a counter is maintained by statistics collection unit 143 to count the number of outstanding requests in segment 114. The counter value is incremented for every request sent and decremented for each response received. Before a request is sent, the counter is compared with the segment upper bound If the counter has not yet reached the segment upper bound, the request is sent. If the counter has reached the segment upper bound, the request is not sent. This ensures that the segment upper bound will not be exceeded before sending a request for segment 114. It will be appreciated that this counter may be embodied in hardware or software using techniques known in the art.

There may also be an upper bound on the number of outstanding requests that exist for each node 169–171. This upper bound exists for each node 169–171 because nodes 169–171 must divert resources away from their switching functions to respond to the requests for statistics. Exceeding this upper bound for nodes 169–171 may cause traffic interruptions and loss of service for the node. Therefore, this upper bound should not be exceeded. Statistics collection unit 143 maintains a separate counter for each node 169–171 in segment 114. The upper bound for each node 169–171 is compared with its counter in the same manner as the segment upper bound. It will be appreciated that these counters may also be embodied in hardware or software using techniques known in the art.

Constraints such as those noted above may cause statistics collection unit 143 to send requests in an order other than the sequence defined by the described method. Typically, the upper bounds for the number of outstanding requests for each segment 112–114 are much larger than the upper bound for the number of outstanding requests for any given node 161–171 in network cloud 110.

In the embodiment, the methods for ensuring the segment and the per-node upper bound for outstanding requests are not exceeded are both performed by statistics collection unit 143. It will be appreciated that, in other embodiments, statistics collection unit 143 may perform only one of the methods of checking the upper bounds or may not perform any method of checking the upper bounds, When nodes 169–171 within node segment 114 respond to the outstanding sent statistics requests, the responses are collected by statistics collection unit 143. When statistics collection unit 143 sends requests to segment 114, it may do so through a standard interface known in the art, such as a socket. Statistics collection unit 143 stores appropriate structures to receive responses from each request. The structures are associated with the socket corresponding to its request. Each response arrives on the same socket on which it was sent. Statistic collection unit 143 combines the information from the responses with the other statistics received from segment 114 and stores this information in its corresponding structure It provides these relevant statistics to statistics aggregation block 130.

It will be appreciated that this process of defining a sequence for sending requests will be repeated for each set of statistics collection configuration information sent to each statistics collection unit 141–143. This may occur on a cyclic time interval since statistics collection configuration information may be in response to scheduled polling from statistics management block 120.

Statistics collection unit 143 may also update the information stored in sets of node attributes 369–371 (FIG. 3) to be used to define a sequence for future requests for statistics. Statistics aggregation block 130 communicates with each of statistics collection units 141–143 to aggregate the segment statistics to produce compiled statistics 132. These are provided as a response to the network statistics configuration 122 received by statistics management block 120. In the embodiment, statistics collection unit 143 has software to control and process various statistics collection and processing functions. These include defining the sequence of initiating requests, accessing and processing node attributes 369–371, ranking the representations of nodes 169–171, translating values of node attributes 369–371, checking counters, effecting communicating with nodes 169–171, statistics management block 120 and statistic aggregation block 130 and gathering and processing statistics, among other things. It will be appreciated that the programs may be embodied in one computer program or many computer programs executing on one or many hardware devices. The software may be stored in random access memory, read only memory, a hard disk, a floppy disk, and any other storage media accessible by statistics collection unit 143. Statistics collection unit 143 may use a central processing unit, a custom hardware device, a microcontroller, or a general purpose computer, among other things, to do any or all of the tasks involved in sending requests to nodes 169–171.

Figure 4:
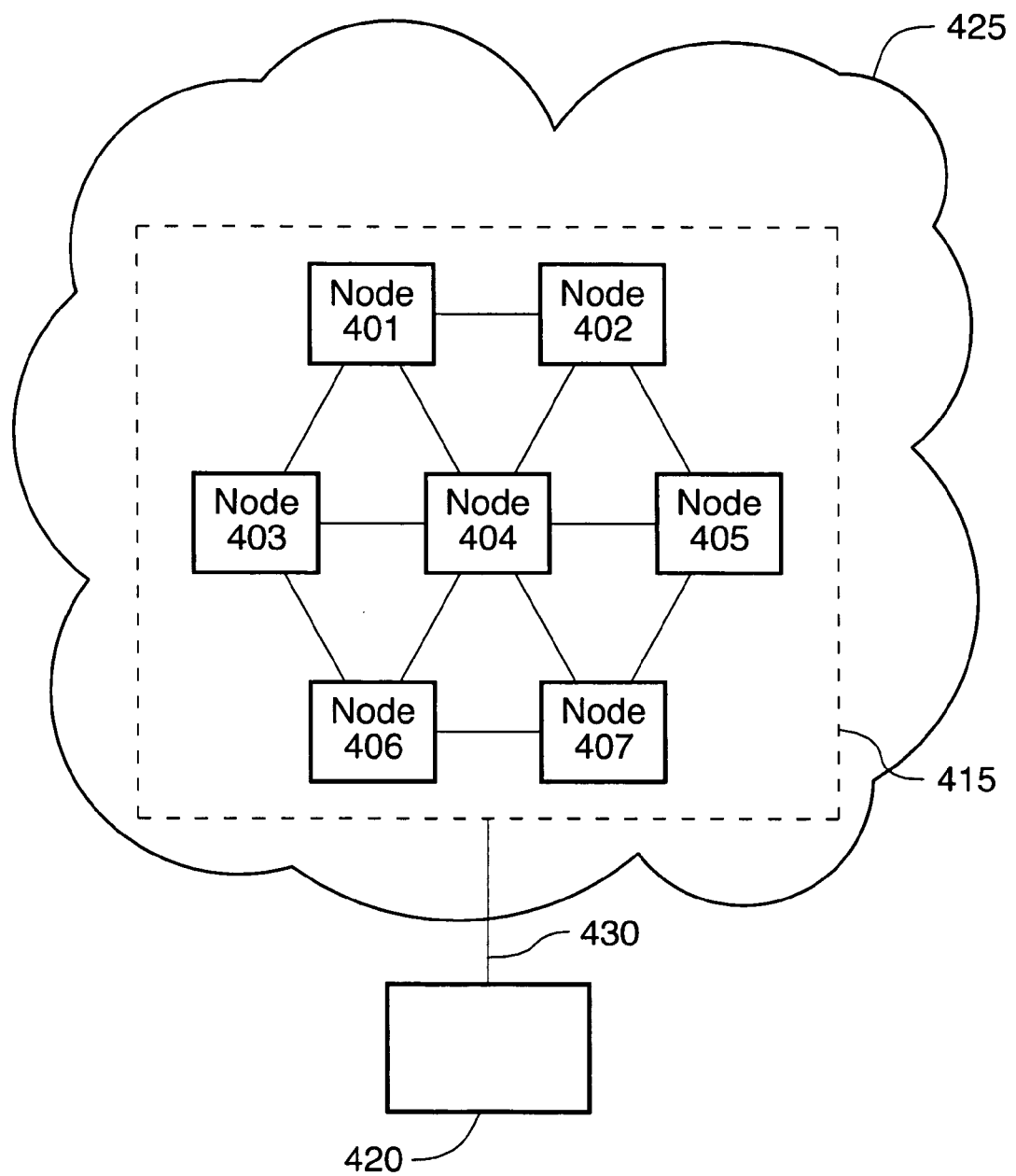
FIG. 4 is a block diagram of another communication network including a statistics collection unit in accordance with the embodiment of the invention.
Figure 5B:
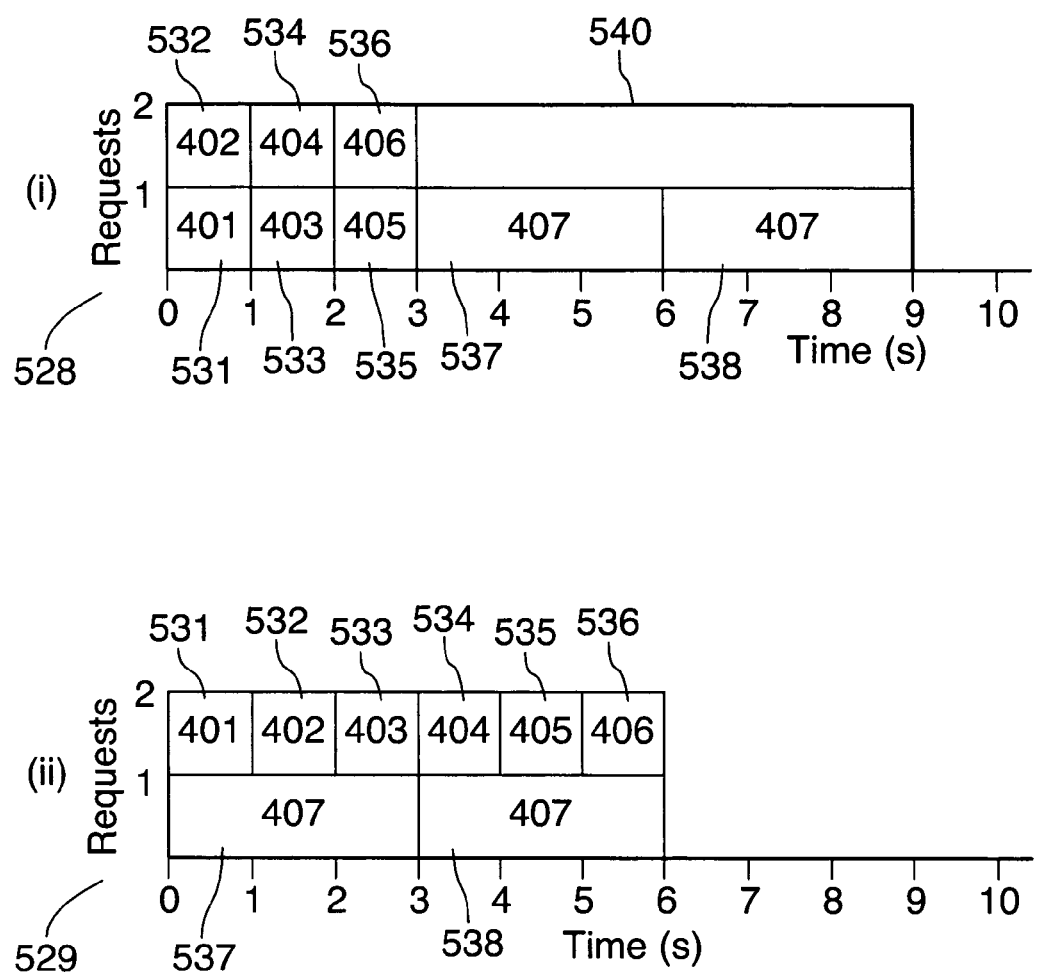
FIG. 5B is a timeline comparing performance of an embodiment to performance of a prior art system using the node attributes of FIG. 5A.

Referring to FIGS. 4, 5A and 5B, an example using the method initiating requests in a defined sequence as described above for network 425 of FIG. 4 is shown. In FIG. 4, network cloud 425 is shown having segment 415 with seven nodes 401–407. Statistics collection unit 420 communicates with nodes 401–407 in segment 415 through link 430. For this example, it is assumed that the responses to requests to nodes 401–406 take exactly one second to arrive back to statistics collection unit 420 and the requests to node 407 take three seconds. The example also imposes upper bounds of one outstanding request per node and two outstanding requests in segment 415.

Referring to FIG. 5A, table 500 shows values for node attributes for seven nodes 401–407. Each row 501–507, in table 500 represents a separate node. There are three columns in table 500 representing node attributes which are monitored for this example. The node attributes shown are the element identifiers (node attribute 510) shown in column 520, the number of requests to be made to each of nodes 401–407 in the next interval (node attribute 512) shown in column 522 and the expected response time based on previous responses from nodes 401–407 (node attribute 514) shown in column 524.

Referring to FIG. 5B, parts (i) and (ii) show timelines 528 and 529 measured in seconds along the horizontal axis. The number of outstanding requests in segment 415 is shown along the vertical axis. Each box on timelines 528 and 529 represents one of requests 531–538, each request 531–538 made to the node whose element identifier, node attribute 510, is contained within the box. The areas of each of the boxes on timelines 528 and 529 represent the bandwidth in link 430 used by requests 531–538 represented by each box.

FIG. 5B(i) shows the results of initiating requests using a prior art method, which initiates requests without defining a sequence. Here the order of initiating requests coincides with node attribute 510 (the element identifier for nodes 401–407) as shown in column 520 in table 500. The requests will be initiated for nodes 401–407 in ascending order of their element identifiers, subject to stated constraints.

FIG. 5B(i) shows that at 0 seconds, request 531 is sent for the statistics from node 401. As the requests to be sent for node 401 have been exhausted, request 532 is sent for node 402, i.e. the node with the next element identifier. At this point, the upper bound on the number of outstanding requests in segment 415 has been reached and no further requests are sent. At 1 second, requests 531 and 532 have received a response and new requests may be sent. Accordingly, requests 533 and 534 are sent at 1 second. Thereafter, the upper bound on the number of outstanding requests in segment 415 has been reached and no further requests are sent. Statistics collection unit 420 continues to initiate requests by receiving responses from requests 533 and 534 and by sending requests 535 and 536 at 2 seconds. At 3 seconds, responses have been received from requests 535 and 536 and statistics collection unit 420 sends request 537 for node 407. After request 537 is sent for node 407, no further requests may be sent. This is because while there is a remaining request 538, also for node 407, the upper bound for outstanding requests for node 407 has been reached. Therefore, request 538 will not be sent until a response is received for request 537. The response for request 537 returns at 6 seconds, at which point, request 538 is sent. Request 538 returns at 9 seconds. The timeline in FIG. 5B(i)

shows that this method of initiating requests results in responses returning for all requests 531–538 in 9 seconds. The unused bandwidth for link 430 in network 425 using this method is indicated on timeline 528 by shaded portion 540.

FIG. 5B(ii) shows the results of a method of the embodiment defining a sequence for initiating the requests using node attribute 512, the number of requests for the nodes, shown in column 522 of table 500. The sorting algorithm selected for this example defines the sequence by the number of requests for the interval for its associated node in descending order. This sequence will attempt to initiate requests for node 407 prior to requests for the other nodes, subject to the stated constraints.

At 0 seconds, using the sequencing algorithm described earlier, request 537 is sent for the statistics to node 407, therefore, no further requests may be sent for node 407 since the upper bound for outstanding requests for node 407 has been reached. Request 538 will not be sent until request 537 returns a response. Since request 538 will not be sent at 0 seconds, request 531 is sent for node 401. At this point, the upper bound for the number of outstanding requests in segment 415 has been reached and no further requests are sent. At 1 second, request 531 has received a response and new requests may be sent. Request 532 is sent at 1 second. Again the upper bound for the number of outstanding requests in segment 415 has been reached and no further requests are sent. At 2 seconds, request 532 has received a response and request 533 for node 403 is sent, At 3 seconds, responses have been received from requests 533 and 537. Request 538 for node 407 is then sent at 3 seconds, along with request 534 for node 404. This process continues with requests 535 and 536 being sent at 4 and 5 seconds respectively.

The timeline in FIG. 5B(ii) shows that this method of defining a sequence for initiating the requests results in responses returning for all requests 531–538 in 6 seconds. This is an improvement over the method of FIG. 5B(i) which required 9 seconds. The method of FIG. 5B(i) runs the risk of not sending some requests in time to obtain the statistics required before the statistics recorded for the interval are discarded by the counters.

The elements of FIG. 5B(ii) also illustrate an example using the response time, node attribute 514, as the selected node attribute, shown in column 524 of table 500. The algorithm selected for this example defines a sequence for initiating the requests for the nodes by the longest response time for the interval in descending order. The sequence of requests will attempt to send requests for node 407 first, followed by nodes 401, 402, 403, 404, 405 and 406. Similarly, this method of initiating requests results in responses returning for all requests 531–538 in 6 seconds, In the example of FIGS. 5A and 5B, the network operator utilized a selected node attribute for the interval resulting in a maximized number of requests sent and responses received over a time interval. However, a network operator may want to impose a specific sequence using this mechanism to give a particular node or message type the highest priority even though this may not be the most efficient sequence for initiating requests. Also, it is possible for the prior art method of sending requests to nodes in a network to produce the optimum result in that all requests receive a response in each interval. However, allowing the network operator to configure the sequence in which requests are initiated allows the network operator to select and rank relevant factors when polling the network.

It will be appreciated that the device defining the sequence for initiating the requests may alternatively employ a self-teaching method of defining a sequence for initiating requests without having the network operator select a selected node attribute. The self-teaching method could define the sequence based on a number of pre-programmed factors to optimize the collection of statistics from certain nodes or all of the nodes in the segment or network. The pre-programmed factors may be based on the results from previous collections performed with different sequencing methods. The self-teaching method may be performed in a simulated environment and the optimal method recommended to network operators.

An additional feature of the embodiment described above is the use of individual upper bounds for the upper bound on the number of outstanding requests allowed for the nodes in the network.

Figure 6A:
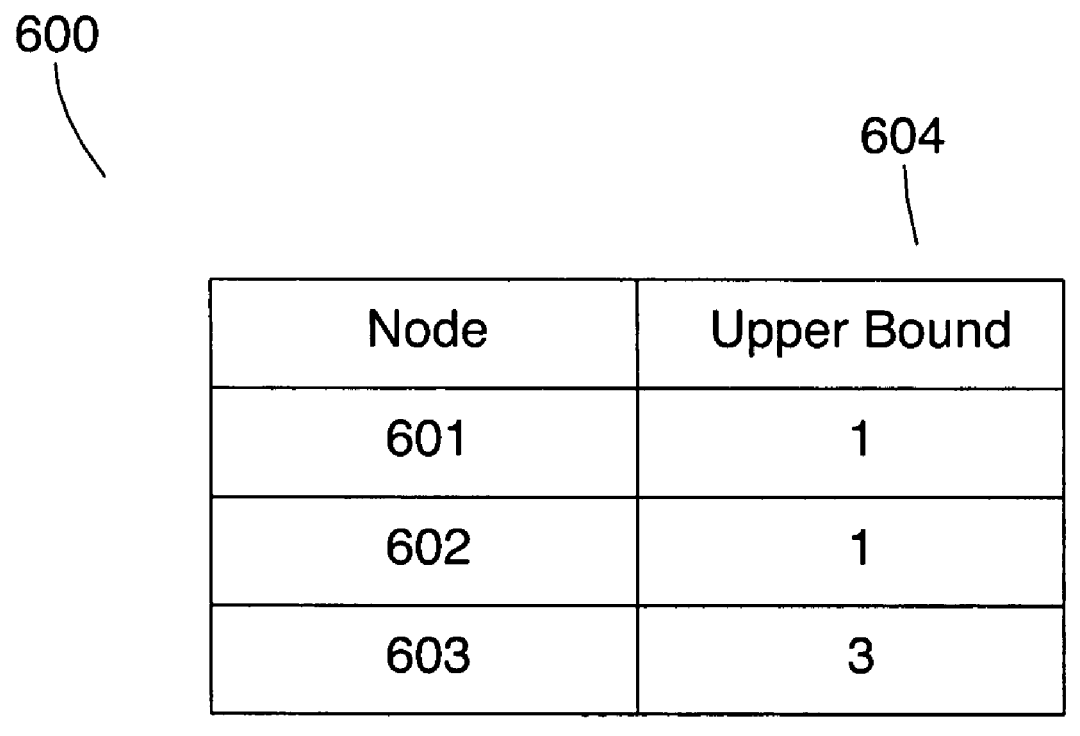
Figure 6B:
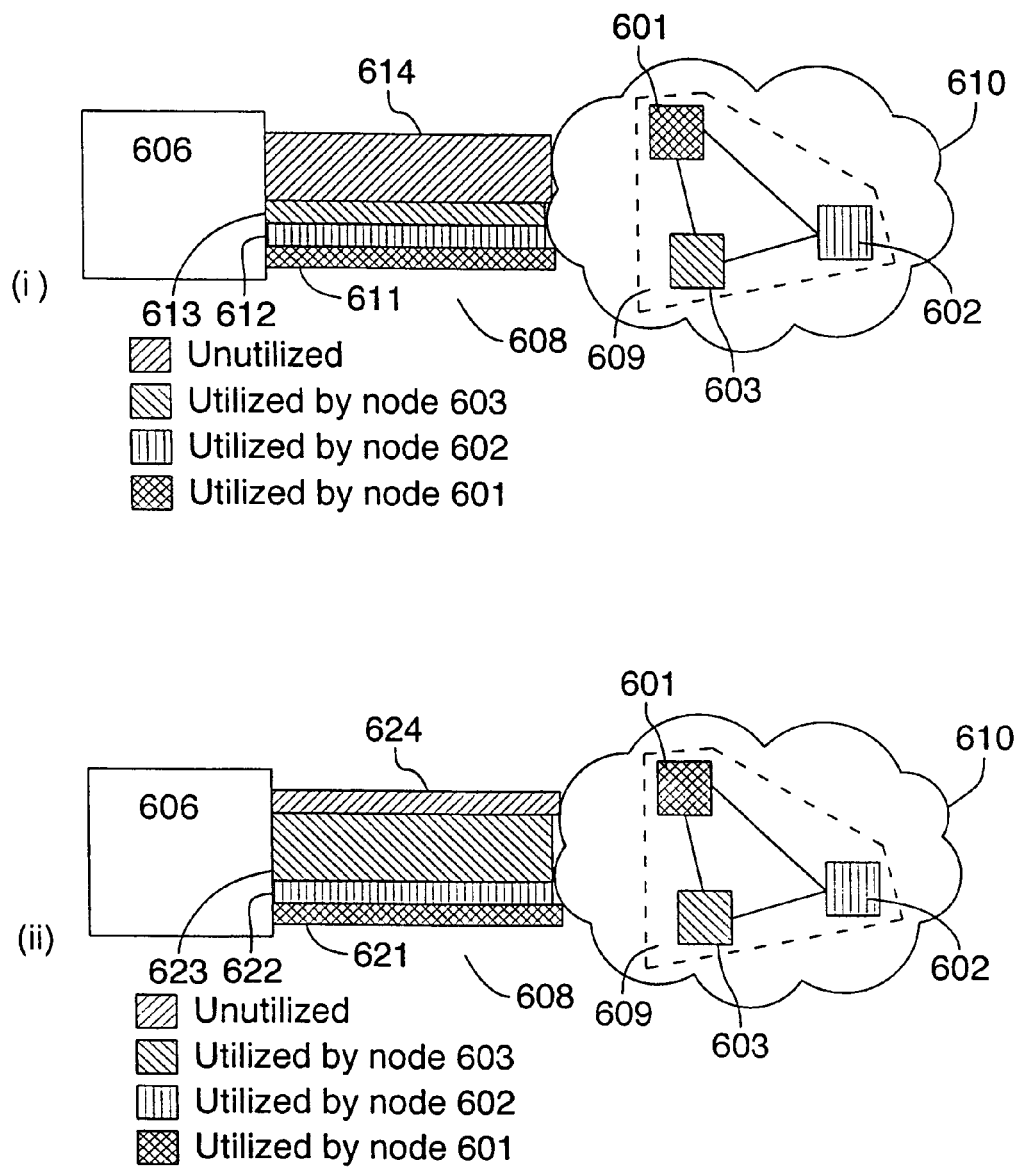
FIG. 6B is a block diagram comparing performance of an embodiment to performance of a prior art system using the example of FIG. 6A.

Referring to FIGS. 6B(i) and (ii), network 610 is shown having segment 609 with three nodes 601–603. Statistics collector 606 collects statistics from nodes 601–603 through link 608. Referring to FIG. 6A, table 600 provides a row for each of nodes 601–603 in network 610. Column 604 of table 600 gives the upper bound for the number of outstanding requests that each node 601, 602 and 603 can process at any one time.

In prior art systems, statistics collection unit 606 typically uses an overly conservative constraint for the number of outstanding requests for a node, such as the smallest number for all nodes 601–603, as the constraint for each of nodes 601–603 in segment 609 or network 610. In the example presented, the smallest upper bound from column 604 is one outstanding request.

FIG. 6B(i) shows the requests sent in network 610 using a prior art system. While the prior art system avoids overloading nodes 601–603 with requests to which they cannot respond, one or more of nodes 601–603 may be underutilized. This may contribute to a deferral in requesting and receiving responses for statistics since statistics collection unit 606 may have to wait for a response before initiating more requests to a node although the node is able to process more requests immediately. FIG. 6B(i) shows that this example results in a large amount of unutilized bandwidth in link 608, represented by shaded portion 614. The amount of bandwidth in link 608 used by each of nodes 601, 602 and 603 is one outstanding request, respectively represented by shaded portions 611, 612 and 613. The values for column 604 from table 600 in FIG. 6A shows that node 603 can process two more outstanding requests, using some of the unutilized bandwidth in shaded portion 614 of link 608.

Referring to FIG. 6B(ii), in the embodiment, the network operator separately defines the upper bound for the outstanding requests for each of nodes 601–603 in network 610 given the upper bounds from column 604 of table 600 in FIG. 6A. The data contains a mapping between the node address of nodes 601–603 and the upper bound value for that node. The statistics collection unit 606 reads and updates these upper bounds on the direction of the network operator. It will be appreciated that the separately defined upper bound need not be the values given in column 604 but may be other suitable numbers chosen by the network operator. The network operator, in this example, defines the individual upper bound as equal to the upper bound from column 604 of table 600. Statistics collection unit 606 maintains a counter for each node 601–603 in segment 609. The counter value is incremented for a node 601–603 if statistics collection unit 606 sends a request for that node 601–603. The counter value is decremented for a node 601–603 if statistics collection unit 606 receives a response from that node 601–603. Before sending a request for a node 601–603, statistics collection unit 606 compares the counter for that node 601–603 with the separately defined upper bound for outstanding requests for that particular node 601–603. If the counter has not yet reached the node upper bound, the request is sent. If the counter has reached the node upper bound, the request is not sent.

Using the individual upper bounds for each node 601–603, the amount of bandwidth in link 608 used by each of nodes 601, 602 and 603 is now one outstanding request for each of nodes 601 and 602, respectively represented by shaded portions 621 and 622 and three outstanding requests for node 603, represented by shaded portion 623. This allows node 603 in FIG. 6B(ii) to use more of the unutilized bandwidth, the new amount of unutilized bandwidth shown in shaded portion 624 of link 608.

Using the method of defining a sequence for initiating requests described with reference to FIG. 1, statistics collection unit 143 initiates a request after determining that the upper bound for segment 114 and the per-node upper bound for the number of outstanding requests will not be exceeded with a further request for the particular node in segment 114. Determining that the per-node upper bound for outstanding requests will not be exceeded uses the separately defined upper bound for each individual node 169–171 rather than the overall constraint typical in the prior art. For efficient operation, the separately defined upper bounds for nodes 169–171 in segment 114 are stored in an area that is readily accessible to statistics collection unit 143. It will be appreciated that individual upper bounds may be stored in random access memory, a hard disk, a floppy disk, and any other storage media accessible by statistics collection unit 143. In the embodiment, the upper bounds are stored within each statistics collection unit 141–143. Similarly, statistics collection unit 141 determines that the upper bounds for nodes 161–164 and segment 112 will not be exceeded before sending a request and statistics collection unit 142 determines that the upper bounds for nodes 165-168 and segment 113 will not be exceeded before sending a request.

It will also be appreciated that in another embodiment an algorithm may be used to define the sequence which is a hybrid of algorithms described herein.

It is noted that those skilled in the art will appreciate that various modifications of detail may be made to the embodiments described herein, which would come within the spirit and scope of the invention as defined in the following claims.

We claim:

1. A method of defining an order for sending a plurality of request for statistics to an associated plurality of nodes in a communication network, on or more requests of said plurality of requests being associated with an individual node of said associated plurality of nodes and each of said associated plurality of nodes having one or more node attributes, said method comprising steps of:
   defining for each node of said associated plurality of nodes a translated value related to a value of a selected node attribute of said one or more node attributes of each of said associated plurality of nodes;
   after all translated values of said associated plurality of nodes are defined, defining a sequence for sending said plurality of requests to be sent to said associated plurality of nodes, said sequence based on said value of said selected node attribute and a ranking of said all translated values;
   initiating each of said plurality of requests according to said sequence.

2. Then method of defining an order for sending a plurality of requests for statistics as claimed in claim 1, wherein said step of defining said sequence comprises selecting two or more of said node attributes and for each of said two or more of said node attributes, refining ranking of said associated plurality of nodes based on said value of said each of said two or more of said node attributes.

3. The method of defining an order for sending a plurality of requests for statistics as claimed in claim 1,
   said method further comprising steps of:
      receiving data regarding a plurality of responses from said associated plurality of nodes which received said plurality of requests; and
      tacking a number of outstanding requests in a segment of said network, said segment associated with said associated plurality of nodes, said number of outstanding requests relating to a number of said plurality of requests in said segment for which responses have not been received, said number of said outstanding requests associated with an upper bound number; and
      wherein said step of initiating each of said plurality of requests comprises comparing said number of outstanding requests in said segment with said upper bound number and initiating one request of said plurality of requests when said number of outstanding requests in said segment is less than said upper bound number.

4. The method of defining an order for sending a plurality of requests for statistics as claimed in claim 1,
   said method further comprising steps of:
      receiving data regarding a plurality of responses from each of said associated plurality of nodes which received said plurality of requests; and
      tracking a number of outstanding requests for said each of said associated plurality of nodes, said number of outstanding requests for said each of said associated plurality of nodes relating to a number of said plurality of requests for said each of said associated plurality of nodes for which responses have not been received, each said number of said outstanding requests associated with an upper bound number; and
      wherein for each of said associated plurality of nodes, said step of initiating each of said plurality of requests when said number of said outstanding requests is less than said upper bound number, said each of said plurality of requests being sent independently to said each of said associated plurality of nodes.

5. The method of defining an order for sending a plurality of requests for statistics as claimed in claim 4, wherein said upper bound number for said each of said associated plurality of nodes is separately defined for said each of said associated plurality of nodes in said segment.

6. The method of defining an order for sending a plurality of requests for statistics as claimed in claim 1, wherein:
   said value of said selected node attribute comprises a value representing a number of said plurality of requests to be initiated for each of said associated plurality of nodes in a time interval; and
   said step of defining said sequence ranks said associated plurality of nodes in descending order utilizing each of said values of said selected node attribute of said associated plurality of nodes.

7. The method of defining an order for sending a plurality of requests for statistics as claimed in claim 1, wherein:

said selected node attribute is a response time of each of said associated plurality of nodes to previous requests of said plurality of requests; and said step defining said sequence ranks said associated plurality of nodes in descending order utilizing each of said values of said selected node attribute of said associated plurality of nodes.

8. The method of defining an order for sending a plurality of requests for statistics as claimed in claim 1, wherein:

said selected node attribute identifies an operating characteristic of each of said associated plurality of nodes; and said step of defining said sequence ranks said associated plurality of nodes in a predetermined order utilizing each of said values of said selected node attribute of said associated plurality of nodes.

9. The method of defining an order for sending a plurality of requests for statistics as claimed in claim 8, wherein:

said operating characteristic indicates wireless and non-wireless transmission technologies associated with said each of said associated plurality of nodes; and said step defining said sequence ranks said associated plurality of nodes utilizing values of said operating characteristic, ranking nodes of said associated plurality of nodes having wireless transmission technologies with a higher priority.

10. The method of defining an order for sending a plurality of requests for statistics as claimed in claim 1, wherein said method is embodied in a computer program.

11. The method of defining an order for sending a plurality of requests for statistics as claimed in claim 1, wherein said method is repeated in a cyclic time interval.

12. The method of defining an order for sending a plurality of requests for statistics as claimed in claim 3, wherein said method further comprises a step of:

tracking a second number of other outstanding requests for said each of said associated plurality of nodes, said second number of other outstanding requests for said each of said associated plurality of nodes relating to a number of said plurality of requests for said each of said associated plurality of nodes for which responses have not been received, each said second number of other outstanding requests associated with a nodal upper bound number; and wherein said step of initiating each of said plurality of requests is performed when said number of said outstanding requests for said segment is less than said upper bound number and said second number of other outstanding requests is less than said nodal upper bound number for said individual node associated with said each of said plurality of requests.

13. A statistics collection unit associated with a communication network, said communication network comprising a plurality of nodes and each of said nodes having one or more node attributes, said statistics collection unit comprising:

a computer; and a program executed on said computer, said program comprising:

a sequencing module defining a sequence for sending a plurality of requests for statistics to be sent to an associated plurality of nodes of said plurality of nodes, one or more requests of said plurality of requests being associated with an individual node of said associated plurality of nodes, said sequence based on a value of a selected node attribute of said one or more node attributes of each of said associated plurality of nodes;

an initiating module initiating each of said plurality of requests according to said sequence; and a translation module defining for each node of said associated plurality of nodes a translated value related to said value of said selected node attribute prior to definition of said sequence by said sequencing module, wherein said sequencing module utilizes a ranking of all translated values of said associated plurality of nodes to define said sequence.

14. The statistics collection unit as claimed in claim 13, wherein said sequencing module defines said sequence by selecting two or more of said node attributes and for each of said two or more of said node attributes, and refining said ranking based on said value of said each of said two or more of said node attributes.

15. The statistics collection unit as claimed in claim 13, wherein:

said program further comprises:

a receiving module receiving data regarding a plurality of responses from said associated plurality of nodes which received said plurality of requests; and a tracking module tracking a number of outstanding requests in a segment of said communication network, said segment comprising said associated plurality of nodes, said number of outstanding requests relating to a number of said plurality of requests in said segment for which responses have not been received, said number of said outstanding requests associated with an upper bound number; and said initiating module initiates each of said plurality of requests by comparing said number of outstanding requests in said segment with said upper bound number and initiating one request of said plurality of requests when said number of outstanding requests in said segment is less than said upper bound number.

16. The statistics collection unit as claimed in claim 13, wherein:

said program further comprises:

a receiving module receiving data regarding a plurality of responses from each of said associated plurality of nodes which received said plurality of requests; and a tracking module tracking a number of outstanding requests for said each of said associated plurality of nodes, said number of outstanding requests for said each of said associated plurality of nodes relating to a number of said plurality of requests for said each of said associated plurality of nodes for which responses have not been received, each said number of said outstanding requests associated with an tipper bound number; and for each of said associated plurality of nodes, said initiation module initiates each of said plurality of requests when said number of said outstanding requests is less than said upper bound number, said each of said plurality of requests being sent independently to said each of said associated plurality of nodes.

17. An apparatus for use in a statistics collection unit in a communication network, said apparatus comprising:

a device defining a sequence for sending a plurality of requests for statistics to be sent from said statistics collection unit to an associated plurality of nodes of said plurality of nodes and defining for each node of said associated plurality of nodes a translated value related to said value of said selected node attribute prior to said defining said sequence,
wherein for said device
one request of said plurality of requests is associated with an individual node of said associated plurality of nodes;
each of said associated plurality of nodes has one or more node attributes;
said sequence is based on a ranking all of translated values; and
said device initiates each of said plurality of requests according to said sequence.

18. The apparatus for use in a statistics collection unit as claimed in claim 17, wherein for said device said defining said sequence comprises selecting two or more of said node attributes and for each of said two or more of said node attributes, refining said ranking of said associated plurality of nodes based on said value of said each of said two or more of said node attributes.

19. The apparatus far use in a statistics collection unit as claimed in claim 17, wherein said device:
receives data regarding a plurality of responses from said associated plurality of nodes which received said plurality of requests;
tracks a number of outstanding requests in a segment of said network, said segment comprising said associated plurality of said nodes, said number of outstanding requests relating to a number of said plurality of requests in said segment for which responses have not been received, said number of said outstanding requests associated with an upper bound number; and
initiates each of said plurality of requests by comparing said number of outstanding requests in said segment with said upper bound number and initiating one request of said plurality of requests when said number of outstanding requests in said segment is less than said upper bound number.

20. The apparatus for use in a statistics collection unit as claimed in claim 17, wherein said device:
receives data regarding a plurality of responses from each of said associated plurality of nodes which received said plurality of requests;
tacks a number of outstanding requests for said each of said associated plurality of nodes, said number of outstanding requests for said each of said associated plurality of nodes relating to a number of said plurality of requests for said each of said associated plurality of nodes for which responses have not been received, each said number of said outstanding requests associated with an upper bound number; and
for each of said associated plurality of nodes, initiates each of said plurality of requests when said number of outstanding requests is less than said upper bound number, said each of said plurality of requests being sent independently to said each of said associated plurality of nodes.

21. The apparatus for use in a statistics collection unit as claimed in claim 20, wherein said upper bound number for said each of said associated plurality of nodes is separately defined for said each of said associated plurality of nodes.

22. The apparatus for use in a statistics collection unit as claimed in claim 17, wherein:
said selected node attribute comprises a value representing a number of said plurality of requests to be initiated for each of said associated plurality of nodes in a time interval; and
said device defines said sequence by ranking said associated plurality of nodes in descending order utilizing each of said value of said selected node attribute of said associated plurality of nodes.

23. The apparatus for use in a statistics collection unit as claimed in claim 17, wherein:
said selected node attribute is a response time of each of said individual nodes to previous requests of said plurality of requests; and
said device defines said sequence by ranking said associated plurality of nodes in descending order utilizing each of said value of said selected node attribute of said associated plurality of nodes.

24. The apparatus for use in a statistics collection unit as claimed in claim 17, wherein:
said selected node attribute identifies an operating characteristic of each of said associated plurality of nodes; and
said device defines said sequence by ranking said associated plurality of nodes in a predetermined order utilizing each of said value of said selected node attribute of said associated plurality of nodes.

25. The apparatus for use in a statistics collection unit as claimed in claim 24, wherein:
said operating characteristic indicates wireless and non-wireless transmission technologies associated with said each of said associated plurality of nodes; and
said device defines said sequence by ranking said associated plurality of nodes utilizing values of said operating characteristic, ranking nodes of said associated plurality of nodes having wireless transmission technologies with a higher priority.

26. A computer executable program embodied on a computer readable medium for use on a communication network, said communication network comprising a plurality of nodes, said computer executable program executing the steps of:
defining a sequence for sending a plurality of requests for statistics to an associated plurality of nodes of said plurality of nodes by
defining for each of said associated plurality of nodes a translated value related to a value of a selected node attribute of said one or more node attributes of each of said associated plurality of nodes; and
after all translated values of said associated plurality of nodes are defined, defining a sequence for sending said plurality of requests to be sent to said associated plurality of nodes, said sequence based on said value of said selected node attribute and a ranking of said all translated values; and
initiating each of said plurality of requests according to said sequence.

27. The computer executable program as claimed in claim 26, wherein
said computer executable program further executing the steps of
receiving data regarding a plurality of responses from said associated plurality of nodes which received said plurality of requests; and
tracking a number of outstanding requests in a segment of said communication network, said segment comprising said associated plurality of nodes, said number of outstanding requests relating to a number of said plurality of requests in said segment for which responses have not been received, said number of said outstanding requests associated with an upper bound number; and
said each of said plurality of requests is initiated by comparing said number of outstanding requests in said segment with said upper bound number and initiating one request of said plurality of requests when said number of outstanding requests in said segment is less than said upper bound number.

28. The computer executable program as claimed in claim 26, wherein
said computer executable program further executing the steps of
receiving data regarding a plurality of responses from each of said associated plurality of nodes which received said plurality of requests; and
tacking a number of outstanding requests for said each of said associated plurality of nodes, said number of outstanding requests for said each of said associated plurality of nodes relating to a number of said plurality of requests for said each of said associated plurality of nodes for which responses have not been received, each said number of said outstanding requests associated wit an upper bound number; and
for each of said associated plurality of nodes, said each of said plurality of requests is initiated when said number of outstanding requests is less than said upper bound number, said each of said plurality of requests being sent independently to said each of said associated plurality of nodes.

* * * * *

UNITED STATES PATENT AND TRADEMARK OFFICE
CERTIFICATE OF CORRECTION

PATENT NO.        : 7,054,274 B2
APPLICATION NO. : 09/833531
DATED             : May 30, 2006
INVENTOR(S)       : Wlodek Olesinski et al.

It is certified that error appears in the above-identified patent and that said Letters Patent is hereby corrected as shown below:

1. Claim 1, column 15, line 51: Replace the word "on" with the word -- one --.

2. Claim 2, column 16, line 1: Replace the word "Then" with the word -- The --.

3. Claim 3, column 16, line 14: Replace the word "tacking" with the word -- tracking --.

4. Claim 7, column 17, line 4: Insert the word "of" after the word -- step --.

5. Claim 9, column 17, line 23: Insert the word "of" after the word -- step --.

6. Claim 16, column 18, line 53: Replace the word "tipper" with the word -- upper --.

7. Claim 17, column 19, line 8: Insert the word "of" after the word -- ranking --.

8. Claim 19, column 19, line 19: Replace the word "far" with the word -- for --.

9. Claim 20, column 19, line 42: Replace the word "tacks" with the word -- tracks --.

10. Claim 28, column 21, line 12: Replace the word "tacking" with the word -- tracking --.

11. Claim 28, column 22, line 5: Replace the word "wit" with the word -- with --.

12. Specification, column 2 , line 18: Replace the word "Or" with the word -- or --.

13. Specification, column 2, line 36: Replace the word "inventions" with the word -- invention -- and insert a comma -- , -- after the word "invention".

14. Specification, column 3, line 28: Replace the word "nonwireless" with the word -- non-wireless --.

UNITED STATES PATENT AND TRADEMARK OFFICE
CERTIFICATE OF CORRECTION

PATENT NO. : 7,054,274 B2
APPLICATION NO. : 09/833531
DATED : May 30, 2006
INVENTOR(S) : Wlodek Olesinski et al.

It is certified that error appears in the above-identified patent and that said Letters Patent is hereby corrected as shown below:

15. Specification, column 7, line 25: Replace the word "bandwidths" with the word -- bandwidth --.

Signed and Sealed this

Twentieth Day of March, 2007

JON W. DUDAS
*Director of the United States Patent and Trademark Office*